US006246485B1

(12) United States Patent
Brown et al.

(10) Patent No.: US 6,246,485 B1
(45) Date of Patent: Jun. 12, 2001

(54) PRINTER COMMUNICATION SYSTEM AND METHOD

(75) Inventors: Rickey Carter Brown, Bardstown; Joseph Peterson Kolb, Lexington, both of KY (US); Gail Marie Songer, Foster City, CA (US); Edward William Yohon, Jr., Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 08/652,858

(22) Filed: May 23, 1996

(51) Int. Cl.[7] .............................. B41B 15/00; B41J 15/00; G06F 15/00; H04N 1/21
(52) U.S. Cl. ...................... 358/1.13; 358/1.14; 358/1.16; 358/296; 358/404; 358/443
(58) Field of Search ..................................... 395/109, 114, 395/112, 115, 116, 111; 358/296, 404, 1.14, 1.13, 1.16, 443

(56) References Cited

U.S. PATENT DOCUMENTS

| 5,075,875 | 12/1991 | Love et al. ............................ 395/117 |
| 5,084,875 | 1/1992 | Weinberger et al. ................. 371/291 |
| 5,164,842 | 11/1992 | Gauronski et al. .................... 358/401 |
| 5,214,772 | 5/1993 | Weinberger et al. ................. 395/575 |
| 5,220,566 | 6/1993 | Ikenoue ................................. 370/112 |
| 5,220,674 | 6/1993 | Morgan et al. ....................... 395/800 |
| 5,226,112 | 7/1993 | Mensing et al. ...................... 395/114 |
| 5,247,623 | 9/1993 | Sun ........................................ 395/325 |
| 5,268,993 | * 12/1993 | Ikenoue et al. ....................... 395/114 |
| 5,271,065 | 12/1993 | Rourke et al. ............................ 382/1 |
| 5,297,246 | 3/1994 | Horiuchi et al. . |
| 5,303,336 | 4/1994 | Kageyama et al. ................... 395/114 |
| 5,323,393 | 6/1994 | Barrett et al. ........................ 370/85.8 |
| 5,333,286 | 7/1994 | Weinberger et al. ................. 395/575 |
| 5,353,388 | 10/1994 | Motoyama ............................ 395/117 |
| 5,361,265 | 11/1994 | Weinberger et al. ................. 371/29.1 |

(List continued on next page.)

FOREIGN PATENT DOCUMENTS

| 0 556 994 A1 | 8/1993 | (EP) . |
| 0598501A1 | * 10/1993 | (EP) ................................ G06F/3/12 |
| 0575 168 A1 | 12/1993 | (EP) ................................ G06F/3/12 |
| 0 598 501 A1 | 5/1994 | (EP) . |
| 0 684 546 A1 | * 11/1995 | (EP) ................................ G06F/3/12 |

OTHER PUBLICATIONS

HP LaserJet 5Si and 5Si MX Printer User's Guide, 1995, cover pages, pp. 4–26, 4–27, and 5–32 through 7–2.

(List continued on next page.)

*Primary Examiner*—Edward Coles
*Assistant Examiner*—Twyler Lamb
(74) *Attorney, Agent, or Firm*—Ronald K. Aust, Esq.; D. Brent Lambert

(57) ABSTRACT

A printer communication system includes a printer (20) having a printer controller (34) with memory (38) and a processor (36). The printer (20) receives and transmits information through a port (40) to which a host computer (10) is coupled. The printer controller (34) may be programmed to be operable to receive configuration-related commands through the port (40), process the configuration-related commands received by the port immediately provided that a command is a safe command to process while the printer (20) is busy processing a print job. The printer (20) may respond to the host computer (10) by indicating that the change was successful or that the printer (20) must be taken offline before the change may be made. The printer controller (34) is programmed to be remotely taken offline and put back online. A symbol set list command may be used by printer (20) to send symbol sets to host computer (10). Font information may also be sent to a host computer (10) by a printer (20) so that a font table including associated symbol sets may be constructed in computer (10).

25 Claims, 6 Drawing Sheets

U.S. PATENT DOCUMENTS

| | | | |
|---|---|---|---|
| 5,371,837 | | 12/1994 | Kimber et al. ............... 395/114 |
| 5,438,528 | | 8/1995 | Emerson et al. ............. 364/580 |
| 5,559,933 | * | 9/1996 | Boswell ........................ 395/114 |
| 5,580,177 | * | 12/1996 | Gase et al. .................... 395/114 |
| 5,699,494 | * | 12/1997 | Colbert et al. ................ 395/114 |
| 6,052,204 | * | 4/2000 | Mori et al. .................... 358/296 |

OTHER PUBLICATIONS

Network Printing Alliance Protocol, A Printer/Host Control Specification, Level 1, Revision N, Feb. 11, 1994, Developed By The Network Printing Alliance.

HP JetDirect Network Interface Configuration Guide, Hewlett–Packard Manual Part No. J2371–90001, 1993, pp. iv–ix and Section 2 Software Installation and Configuration for Novell Netware Networks, pp. 2–2 through 2–18.

HP JetDirect EX External Network Interface Configuration Guide, Hewlett–Packard Manual Part No. J2382–90101, 1993, pp. 7–12 and Section 2 Novell NetWare Networks, pp. 2–2 through 2–36.

Lexmark WinWriter 600 User's Reference, Manual No. SA40–0779–00, 1993, Chapter 2 Using the Windows Printing System, pp. 11–26 and Chapter 3 Checking Print Status, pp. 27–39.

Common Printer Access Protocol (CPAP) Specification, Jun. 16, 1995, Digital Equipment Corporation.

Standard Signaling Method for a Bi–directional Parallel Peripheral Interface for Personal Computers, IEEE p 1284 D2.00, Sep. 10, 1993, Institute of Electrical and Electronic Engineers, pp. 1–119.

* cited by examiner

PRINTER COMMUNICATION SYSTEM AND METHOD

TECHNICAL FIELD OF THE INVENTION

This invention relates in general to the control of printers, and more particularly to a printer communication system and method.

BACKGROUND OF THE INVENTION

Printers receive print data from a source such as a host computer and generate a printed representation of that print data on a page. A printer can serve either single or multiple hosts. For example, a printer may be connected by cable directly to the serial or parallel port of the host to serve that host only. Alternatively, a printer interfaced to a network can be assigned to multiple hosts residing on that network.

Many printers have in the past included a panel for monitoring and manual control of the printer. Manual control might be carried out by way of control devices such as push-button switches, which are sometimes permanently labeled and perform dedicated functions. Status indication and other monitoring functions may be implemented with the aid of indicator lights on the panel or by audible alarms or messaging on a liquid crystal display. Such facilities typically provided control capabilities ranging from rudimentary power switching, an indication of whether the printer is in an online, or ready status, to a variety of more sophisticated functions such as selecting paper size, paper source, font, point size, pitch, manual or automatic feed, print orientation, duplex mode, lines per page, diagnostic testing and others. Monitoring functions may include providing any of a number of visual or audible indications informing a user of condition or service needs of the printer. These indications may take the form of status messages such as "ready" or "busy" which indicate the current condition of the printer. They may also take the form of attendance messages such as "paper jam," "load paper," "toner low," or "top cover open," calling for the intervention of the operator, or may take the form of service error codes indicating problems requiring the attention of a service technician.

Efforts have been made to provide network administrators and users with some capability to monitor and control a remote printer. Exemplary of these are software utilities for configuring, managing and troubleshooting printers on a network, such as Novell NetWare® network. Such a utility allows a network administrator to perform a number of tasks relating to a printer located anywhere on the network. For example, the administrator can gather status information and display the operational status and connection status of a given printer on the screen of the host computer by using a mouse or other pointing device. A printer can also be remotely configured to operate either in a remote printer mode or a queue server mode. In the queue server mode, no separate print server is required. Print data from a host is communicated to a file server where it is spooled in a print queue. When the selected printer is available, a queue server transfers the job to the printer for printing. In the remote printer mode, the print data spooled in the file server is copied to the selected printer by a dedicated print server. The utility also permits a network administrator to add or delete queues or file servers and to remotely install, select or remove printer drivers.

Some prior art printers connected locally to a host have used bidirectional communications implemented with non-standard protocols to permit a user of the host to monitor and control the printer. For example, other than a power switch located elsewhere on the printer, the operator panel of the WinWriter 600 manufactured by Lexmark International, Inc. includes only push buttons labeled "Pause/Resume" and "Cancel" and four indicator lights labeled to show whether the printer is "ready" or is busy "printing" or requires "paper" or "service". All other monitoring and control functions are available through a graphical user interface (GUI) generated by a Windows based utility running on the host. While printers of this type could be shared with network users to permit them to print jobs, the control and monitoring functions available to the user of the local host were not available to the network users.

More recently, it has been suggested that the dependence on the monitoring and selection functions available through the printer panel, which is part of the printer, be lessened. To this end, it has also been suggested that the panel display and functions be replicated to a monitor. For example, Lexmark has a product MarkVision™ for this purpose. While allowing remote access to the printer panel, this approach has maintained a dependency on the printer control panel.

The coordination of fonts and symbol sets between a computer and a printer is an important task in successfully and efficiently printing documents. The "font" is simply a set of characters that share the same basic characteristics. Fonts usually take their names from the type face: courier or helvetica, for example. Each type face is accompanied by a host of specific attributes such as height, pitch (width), spacing, style, symbol set, stroke weight and orientation. The "symbol set" for a font includes the actual characters you can print in it. For the alphabetic characters and numbers, there is little difference among symbol sets, except that most U.S. fonts include the dollar sign where European fonts are more likely to include the sign for pounds sterling. The fonts and symbol sets available in the printer must be known by the user or otherwise communicated to the host computer to allow for proper printing. If the symbol set used by the computer's display monitor is not the one used by the printer, there will be differences or odd characters on the printed page. One way to address this situation is to know the fonts and symbol sets resident in the printer by using the printer's manual and manually entering those into memory of the host computer. This may be inefficient and does not allow for easy changes of fonts and symbol sets in the printer. Thus, it would be desirable to provide font and symbol set information in some automated way to the host.

Therefore, a need has arisen for a printer communication system that reduces the shortcomings of the prior systems. A further need exists for a printer communication system and method that allows for the remote setting of printer configuration variables and monitoring of the printer that is independent of a printer control panel. A further need exists for a printer communication system that efficiently allows a host computer to be aware of font and symbol sets available on a printer.

SUMMARY OF THE INVENTION

The present invention relates to method and apparatus that addresses the disadvantages, problems, and needs set forth above. One aspect of the invention relates to a printer, including a printer controller having a memory for storing a plurality of printer configuration settings and a processor, and a port coupled to the printer controller which receives signals from a host computer, wherein the printer controller receives configuration change information via the port and processes the configuration change information to effect an update of one or more of the plurality of printer configuration settings using the configuration change information while the printer is processing a current print job if the update will not adversely affect the processing of the current print job.

According to another aspect of the present invention, a printer communication system- is provided that will notify the host computer if a configuration-related command is received that is not safe to process immediately, while the printer is busy with a print job, and further will inform the host computer that it should go offline in order to process the configuration-related command.

According to another aspect of the present invention, a printer controller is programmed to receive a remote-offline command and remotely take the printer offline as soon as possible. According to another aspect of the present invention, a printer controller is programmed to receive a remote-online command and remotely take the printer offline in response thereto.

According to another aspect of the present invention, a printer controller is programmed to respond to a "list-symbol-sets" command by transmitting the resident symbol sets to the host computer.

One technical advantage of the present invention is that it allows for remote control and monitoring of a printer, including configuration changes, independent of any control panel on the printer. Another technical advantage of the present invention is that the printer communication system's independence of the printer control panel allows for the elimination of the control panel altogether from the printer. Another technical advantage of the present invention is that safe-printer-configuration changes may be made immediately by the printer. Another technical advantage of the present invention is that the host computer need not know what commands are safe and what commands are unsafe before sending a configuration-related command to the printer. Another technical advantage of the present invention is that the printer communication system will advise the host computer when it should be taken offline before accepting certain "unsafe" configuration-related commands.

Still another technical advantage of the present invention is that symbol set information is provided to a host computer from the printer. Another technical advantage is that the symbol set information and font information are efficiently transferred from the printer to the host without requiring duplication of symbol set information.

Other features and advantages of the invention may be determined from the drawings and detailed description of the invention that follows.

BRIEF DESCRIPTION OF THE DRAWINGS

For a more complete understanding of the present invention and advantages thereof, reference is now made to the following description taken in conjunction with the accompanying drawings in which like reference numbers indicate like features and wherein.

DETAILED DESCRIPTION OF THE INVENTION

Preferred embodiments of the present invention are illustrated in FIGS. 1–9, like numerals being used to refer to like and corresponding parts of the various drawings.

Figure 1:
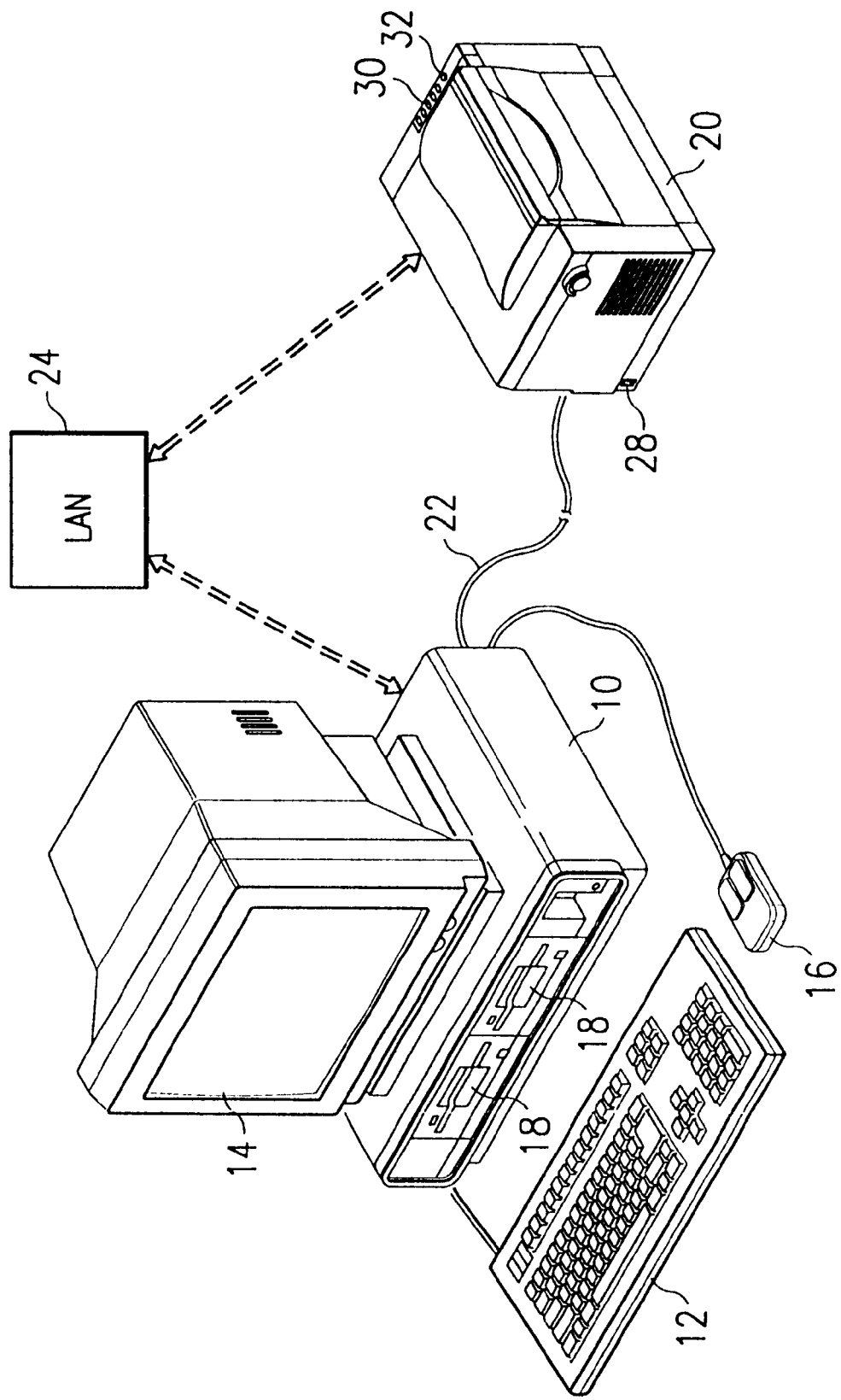
FIG. 1 is a partially diagrammatic, partially pictorial perspective illustration of a host computer and a printer in bidirectional communication embodying the present invention.

Referring to FIG. 1, there is shown a typical host computer 10 having a keyboard 12 and a screen or display 14 associated with it. Computer 10 has a pointing device 16 such as a mouse, touch screen, trackball, or joystick associated with it. Pointing device 16 allows for "clicking on" or otherwise indicating and selecting features appearing on display 14. Host computer 10 may be an IBM-compatible type using an Intel 80X86 microprocessor such as an 80486 or Pentium.

Host computer 10 will typically include components such as an internal hard drive or other suitable program memory and one or more disk drives 18 for uploading programs and data. Computer 10 may also include other devices such as CD ROM drives, optical drives, and other devices known in the art. Computer 10 includes a sufficient amount of internal memory such as random access memory (RAM) to support its operating system as well as all applications utility software desired to run on host computer 10.

Host computer 10 is also connected to one or more printers 20 which may be either connected to host computer 10 locally, such as by cable 22 to a port on computer 10 or by way of a local area network (LAN) 24 through an appropriate commercially-available network card installed in an available expansion slot on host computer 10. A printer 20 installed on network 24 is connected to the network by use of an internal network adapter card (INA) or an external network adapter (ENA). Printer 20 may be physically located at a site nearby or remote from computer 10. Printer 20 may be, for example, an Optra E laser printer, which is a product of Lexmark International Inc., but having additional features as will be described further below.

Printer 20 may include an on/off switch 28, indicator lights 30, offline/online selector 32, and other features as may be expected on a printer. It is to be understood, however, that while the present invention is shown as a modified Lexmark Optra E laser printer, it may be used with any type of printer including other electrophotographic printers, ink jet printers, wire matrix, and other types.

Computer 10 may include software programs that take advantage of aspects of the invention that are programmed into printer 20 as will be described further below. Through the programming of computer 10, bidirectional communication between host computer 10 and printer 20 is possible.

Figure 2:
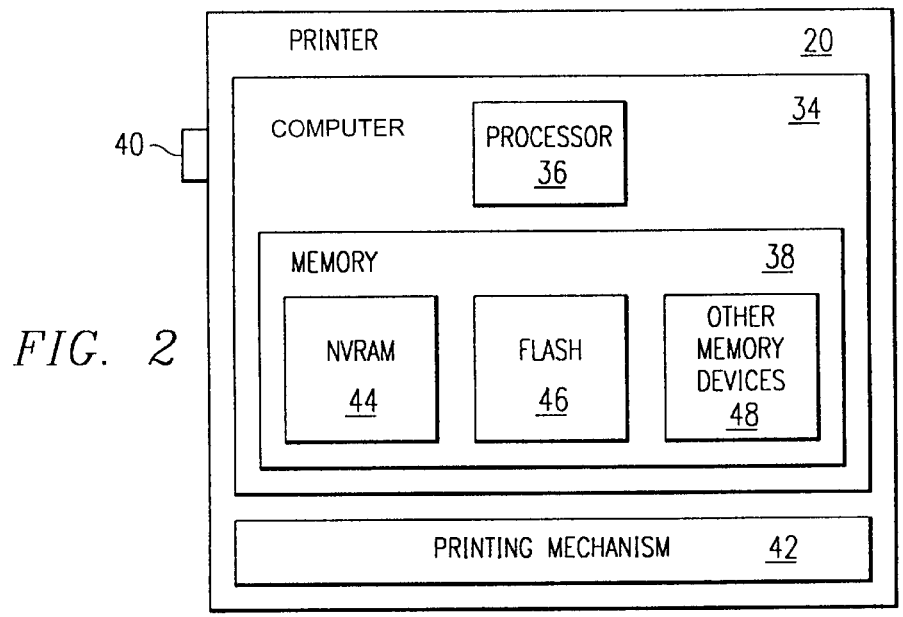
FIG. 2 is a block diagram illustrating functional components of the printer in FIG. 1.

Referring now to FIG. 2, a block diagram illustrating aspects of the functional components of printer 20 is shown. Printer 20 includes within it what may be referred to as a printer computer or controller 34 having a microprocessor 36 and memory 38. Processor 36 and memory 38 may be coupled using techniques known in the art such that processor 36 may operate on programmed instructions and data in memory 38. Additional commands and data may be received by printer controller 34 through port 40. Printer controller 34 is coupled to a printing mechanism print engine 42. Printing mechanism 42 may include all the devices needed to receive signals and print accurate information on paper by such means as a laser. If printer mechanism 42 is a laser device, print mechanism 42 may include devices to receive signals from controller 34, fire and move the laser beam in accordance with the signals, control the movement of paper, sensitize the paper so that it will accept toner that makes up the image, and fuse the image to the paper. Of course, printing mechanism 42 may also utilize other technologies such as a print head used with a dot matrix printer, a print cartridge for use with an ink-jet printer, a drum and film as may be used with a dye-sublimation color printer, a paper train with color ribbons which may be used with a color thermal printer, or other devices known in the art.

Memory 38 may include a non-volatile random access memory (NVRAM) 44, flash memory 46, and other memory devices 48. Other memory devices 48 may include random access memory (RAM), read only memory (ROM), a programmable cartridge, a hard drive, disks, additional NVRAM, or other storage device.

Controller 34 is programmable to provide printer 20 with certain features. One of the features involves when and how default configurations are set in printer 20. Default configuration settings typically include sets of instructions for controlling certain parameters of the printing operations performed by the printer such as fonts, paper sizes, page description languages, finishing options and stackers.

Printer controller 34 is programmed such that configuration changes that are requested by an application running on host 10 are made immediately, if possible, instead of merely placing the request for a configuration change in a queue behind other print jobs. Thus, as to changing configurations, only certain "safe" requests to change the configuration will be permitted to be made immediately. The term "safe" requests refers to those requests which may be executed by printer 20 while printer 20 is processing a print job, and thereby effect substantially immediate changes in the configuration of printer 20 without adversely affecting the processing of the current print job. Other requests, such as for example, changing data transmission rates, will require that printer 20 be taken remotely offline before they are carried out. Furthermore, printer 20 will prompt the host 10 when the host 10 needs to take the printer remotely offline in order to properly process an "unsafe" configuration change request.

Figure 3:
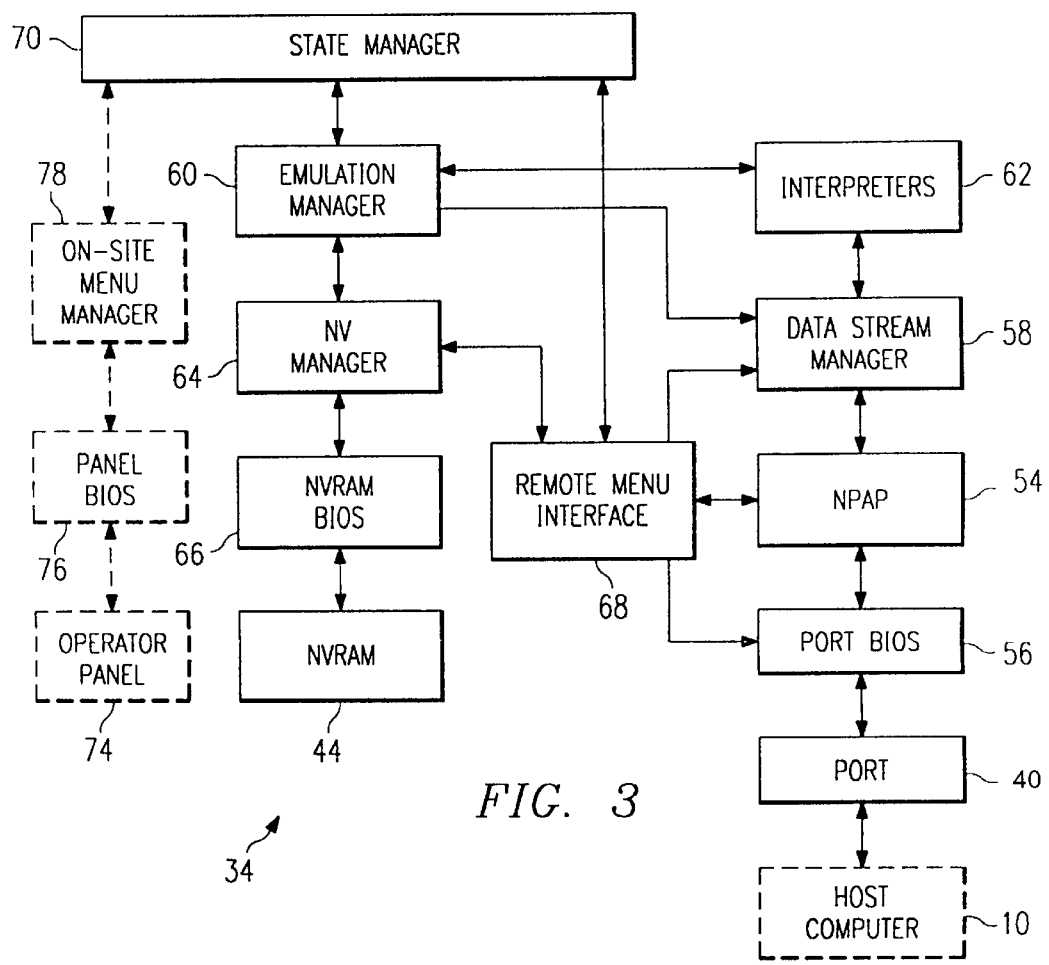
FIG. 3 is a functional block diagram of the architecture of controller 34 of the printer in FIGS. 1 and 2.

Referring now to FIG. 3, microprocessor-based controller 34 is shown with functional blocks. Controller 34 may perform a number of tasks and have a number of stored software programs or code which may be called by different tasks to perform functions in support of the tasks. Controller 34 is capable of affecting the usual printer functions such as interpreting print jobs received in one or more printer control languages by way of port 40, which may be a serial port, parallel port, and/or internal network adapter (INA), and rasterizing and serializing the interpreted data to drive a print engine or print mechanism 42 in order to form a printed representation of the print data on a page.

Printer controller 34 is capable of communicating bidirectionally with host computer 10 by way of at least one communication channel using the Network Printer Alliance Protocol (hereinafter "NPAP"), which is a published protocol specification Level 1, Revision N, dated Feb. 11, 1994. The NPAP is expressly incorporated herein by reference in its entirety for all purposes. This communication channel may be port 40 or LAN 24 (FIG. 1). Port 40 may have a buffer associated with it. Connection of host computer 10 to port 40 may be by any technique known in the art such as by communication cable 22, which may be a standard parallel interface for an IBM compatible personal computer in compliance with IEEE 1284-1994. The principal task for handling the NPAP-compliant communications is the NPAP Task 54, which may have a buffer associated with it.

The NPAP Task 54 performs the functions of handling commands and data in the NPAP format. The NPAP Task 54 supplies printer status information to any locally attached and/or network attached host computers 10 and receives requests for such information from the host computers 10. The NPAP Task 54 may be activated periodically by timer. When activated, NPAP task 54 calls port BIOS 56 of port 40 to determine if data has been received at port 40. If a NPAP command or command extension of the type which will be described further below is received, NPAP Task 54 responds through port 40 either directly or after obtaining needed information from another function in printer controller 34.

It is possible to have the NPAP Task 54 "off" such that print data received is by port BIOS 56 may be passed directly to data stream manager 58. When the NPAP task 54 is "on," however, then only data in the NPAP format will be passed through—after removal of NPAP wrappers or packetization—to the data stream manager 58. Non-NPAP packetized information will be rejected. The NPAP Task 54 may also be in the "auto" mode, in which non-NPAP data or commands are passed through to data stream manager 58 as if the NPAP was "off", but NPAP packetized information is handled by NPAP Task 54 when they are received as if NPAP Task 54 is in the "on" state. As will be described further below, many of the aspects of the invention are concerned with the transfer of information with the NPAP Task 54 assisting with the handling of data or commands.

Printer controller 34 includes an Emulation Manager Task 60 and interpreters 62. When none of the interpreters or emulators 62 are running to provide data for subsequent rasterization and serialization in the printer 20, Data Stream Manager 58 looks for print data at port 40 to direct to the appropriate interpreter 62. In the absence of an active NPAP Task 54, the Emulation Manager 60 calls Data Stream Manager 58 functions in order to transfer print data from port BIOS 56 to a buffer. If the NPAP Task 54 is "on" for a particular port 40, the Data Stream Manager 58 accesses data from a NPAP-Task buffer for that port 40. Emulation Manager 60 and Data Stream Manager 58 cooperate to associate a "job structure" with each print job received at port 40.

The job structure is a dataset associated with each print job and is held in memory for a time. The job structure includes an identification number for the print job, an area to record the number of sides of pages which have been printed, and information on resolution and other specifics. If the job structure is incomplete, the printer default configuration may be consulted for missing data. The job structure data is capable of being modified during the printing process to update the status of the job. For example, as each side of the page to be printed is rendered by a print engine hardware or mechanism 42, the job structure is modified to reflect completion thereof.

Emulation Manager 60 also cooperates with Data Stream Manager 58 to route each print job to the appropriate interpreter (e.g., a PostScript® or PCL® interpreter). The Data Stream Manager 58 passes the print job data in the appropriate language to a selected one of the interpreters 62 until the end of the job, whereupon the Data Stream Manager 58 provides an end-of-job condition to interpreter 62. When interpreter 62 is finished with the print job, it indicates its idle state to Emulation Manager 60. As each page is rendered, the page is provided to a graphics engine software and print mechanism hardware 42 for eventual rasterization of the pages to be printed and serialization of the bit map information to the print mechanism 42.

Non-volatile RAM manager 64 (hereinafter "NV Manager") provides a high level interface through NVRAM BIOS 66 to non-volatile RAM (NVRAM) 44. NV Manager 64 is used by Emulation Manager 60 and the interpreters 62 in creating job structure information where such information is derived from values stored in NVRAM 44. The NPAP Task 54 also can communicate with NV Manager 64 through Remote-Menu Manager or Interface (RMI) 68 to read and write NVRAM 44 settings. These settings may be operated upon immediately under certain conditions, such as when "safe" change requests have been processed.

State Manager 70 is a task which first learns of events external to the code controller 34 that may occur to printer 20. State Manager 70 notes, for example, if the printer cover has been opened and orchestrates providing this information back to users such as NPAP Task 54. State Manager 70 will become aware of certain conditions due to hardware interrupts to the microprocessor of printer 20, while other status information is checked by State Manager 70 on a polling basis. Printer configuration changes and device status alerts are passed from State Manager 70 to NPAP Task 54 for communication to attached host computer 10 using NPAP. The NPAP will be described in more detail below.

The NPA protocol (NPAP) is a protocol which not only defines specific NPAP commands, but which also permits other forms of commands or data to be packetized in order to permit NPAP commands (or extensions) to be interspersed within the normal data stream transmitted by way of ports 52. When active, NPAP Task 54 is capable of recognizing and capturing NPAP commands or command extensions from the data stream for special processing while permitting other information to be processed in the usual way by Data Stream Manager 58. As indicated in FIG. 3, NPAP Task 54 is capable of communicating with NV Manager 64 by way of Remote Menu Interface (RMI) 68 in order to read data from or write information to NVRAM 44. NPAP Task 54 may also access and modify stored job structure information.

A NPAP communication packet is a structured field of digital information. An NPAP packet includes a start of packet byte, a two-byte length field, a flag byte, and a command byte, followed by a sub-command and/or data fields and associated error checking. To facilitate description herein, the error checking bytes which may be placed at the end of a packet in a conventional manner will be omitted. The packet structure is then:

| START | LENGTH | FLAG | COMMAND | DATA |
|-------|--------|------|---------|------|
| A5    | XX XX  | XX   | XX      | XX---|

The entries for the fields are eight-bit bytes shown in hexadecimal (hex) notation. So, for example, the "start of packet" byte for an NPAP packet is hex A5 (decimal 165).

The packet length field is a two-byte word indicating the number of bytes in the packet, not including the length field itself or the start-of-packet byte. The NPAP default value for maximum packet size is 64 bytes. Host computer 10-to-printer 20 packets are often shorter, usually six to eight bytes long. As an example, a packet length of six bytes would be indicated as 00 06. The NPAP Protocol identifies a command that permits host computer 10 to set the maximum packet length that host computer 10 will accept. Typically, if host computer 10 is communicating via a network such as LAN 24, the maximum-receive-packet size is set to the packet size of the communication protocol used by the network. If a response from printer 20 is longer than that packet size, NPAP Task 34 splits the response into two or more acceptably sized packets. NPAP Task 54 indicates that the next packet is a continuation of the current one by setting bit 5 in the packet's flag byte.

In the case of messages from host computer 10 to printer 20, the purpose of the flag byte is to provide a single byte which printer 20 can examine to obtain control information. Each bit of the flag byte may be defined so that there is a meaning if the bit is set (logic one) or cleared (logic zero). For present purposes, the bits four and six are of interest (where bit zero is the least significant bit and bit seven is the most significant bit). Bit six, if set, indicates that the packet contains a message to be processed by the NPAP component of printer controller 34. If bit six is cleared, the packet contains data for a printer interpreter. Bit four, if set, calls for a response from printer 20. If, for example, both bits four and six are set (and no other bits are set), the flag byte is hex 50.

In the case of communication from printer 20 to a host computer 10, the purpose of the flag byte is to provide a single byte which host computer 10 can examine to obtain control information for the message and a quick view of the status of printer 20. As in the case of communications from a host computer 10 to printer 20, the flag byte contains individually defined bits. Of present interest, bit six, if set, indicates that the message is from the NPAP Task 54 of printer controller 34. Bit four, if set, means that the reply was required by host computer 10 (solicited via flag bit four in the message from the host). Bits zero and one are set to the state that printer 20 is in at the time the reply is sent from printer 20. The meanings of the conditions of these bits (bit one-bit zero) are: 00—printer 20 is operable normally with no alert conditions, 01—printer is operable but there is a condition the operator may want to know about (such as a low toner warning), 10— a condition exists which will prevent further printing which can be remedied by the operator, and 11—a condition exists which will prevent further printing and which can be remedied only by a service/repair call.

Returning to the format of a host computer 10-to-printer 20 NPAP packet, the fifth byte is a command byte, whose meaning is dependent upon the state of bit six in the flag byte. If flag bit six is set, the command byte contains a command for the NPAP Task 54 of printer controller 34. If flag bit six is cleared, the command byte contains a logical unit designation for printer controller 34.

In the case of a printer 20-to-host computer 10 reply message, the original command or logical unit identification of host computer 10-to-printer 20 message that caused the reply is returned. If the message from printer 20 is unsolicited (flag bit four cleared and flag bit six set) and the command byte is hex Fx (where x is a valid hex digit), then the packet represents an alert of type hex Fx. For example, a Device Status Alert (DSA) is indicated by a command byte of hex FF.

For packets emanating from a host computer 10, the data bytes following the command byte have a meaning which is dependent upon flag bit six. If flag bit six is set, the data field contains either data or a command modifier, dependent on the command, for the NPAP Task 54 of printer controller 34. If flag bit six is cleared, the data field contains data for the input queue of a logical unit within printer controller 34.

In the case of NPAP packets emanating from printer 20, when flag bit six is set, the data field contains Alert data for a Hex Fx command byte or the packet contains error information or the data field contains a command response as called for by the command returned in the command byte (flag bit four set). When flag bit six is cleared, the data field contains a message from a Logical Unit within controller 34 (such as an interpreter 62) and byte five identifies the Logical Unit from which the message originates.

The published NPA protocol defines a number of commands and subcommands. These include various types of "alerts" intended to be transmitted from a printer to a host computer 10. These are useful for communicating standard error conditions or printer state changes. NPA protocol also provides for customized commands or extensions. The use of the NPA commands and subcommands will be discussed further below with respect to one embodiment of the present invention.

One aspect of the present invention, includes that printer 20 may function without requiring a front panel or being dependent on a front panel. This allows for operator panel 74, panel BIOS 76, and on-site menu manager 78 (all shown in broken lines in FIG. 3) to be eliminated from printer controller 34. Commands and functions carried out by them may now be handled by commands from host computer 10 that are developed and interpreted independent of devices 74, 76 and 78.

Figure 4:
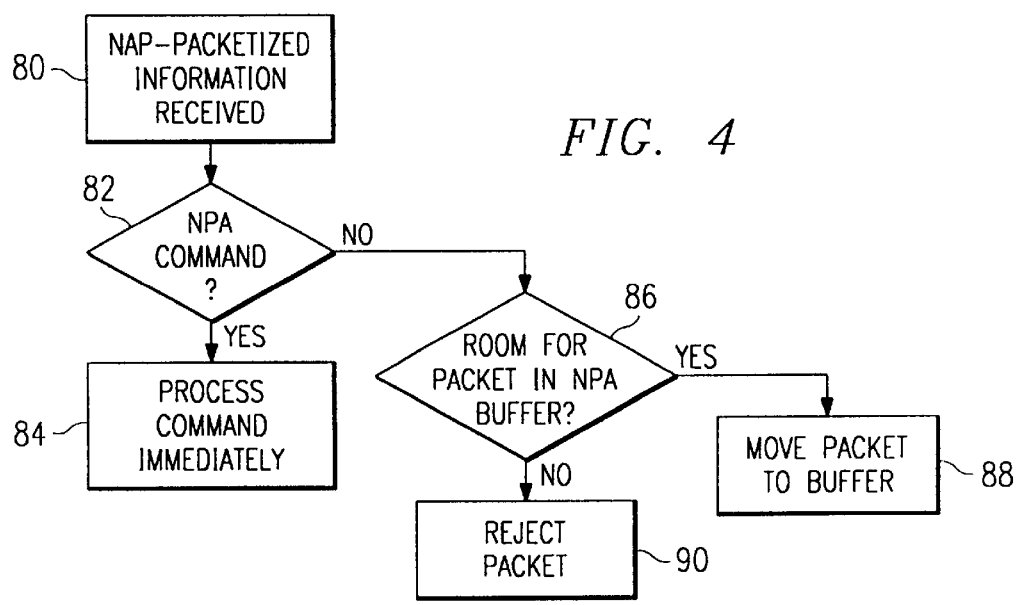
FIG. 4 is a flowchart illustrating the handling of an NPAP packet of information by printer 20 under certain conditions.

FIG. 4 demonstrates how controller 34 handles NPAP-packetized information. NPAP packetized data or information is received at block 80. Next, it is determined whether the information received at block 80 constitutes an NPAP command as shown at interrogatory box 82. If it is an NPAP command, it is processed immediately as indicated at block 84. How the command is processed immediately will be described further below.

If the response to interrogatory box 82 is in the negative, the NPAP-packetized information is not a command, but data. Host computer 10 may selectively utilize a reject-package option that is programmed in controller 34. Assuming that the reject-package option is selected and that interrogatory box 82 has been answered in the negative, a determination is made as reflected by interrogatory box 86 as to whether the buffer associated with NPAP Task 54 is sufficiently available to receive the data, thus allowing immediate processing of any potential NPA commands waiting in the BIOS port buffer 56. If adequate room exists in the buffer of NPAP Task 54, the data is moved into the buffer as reflected at box 88. If not, the packet is rejected as shown at box 90.

Figure 5:
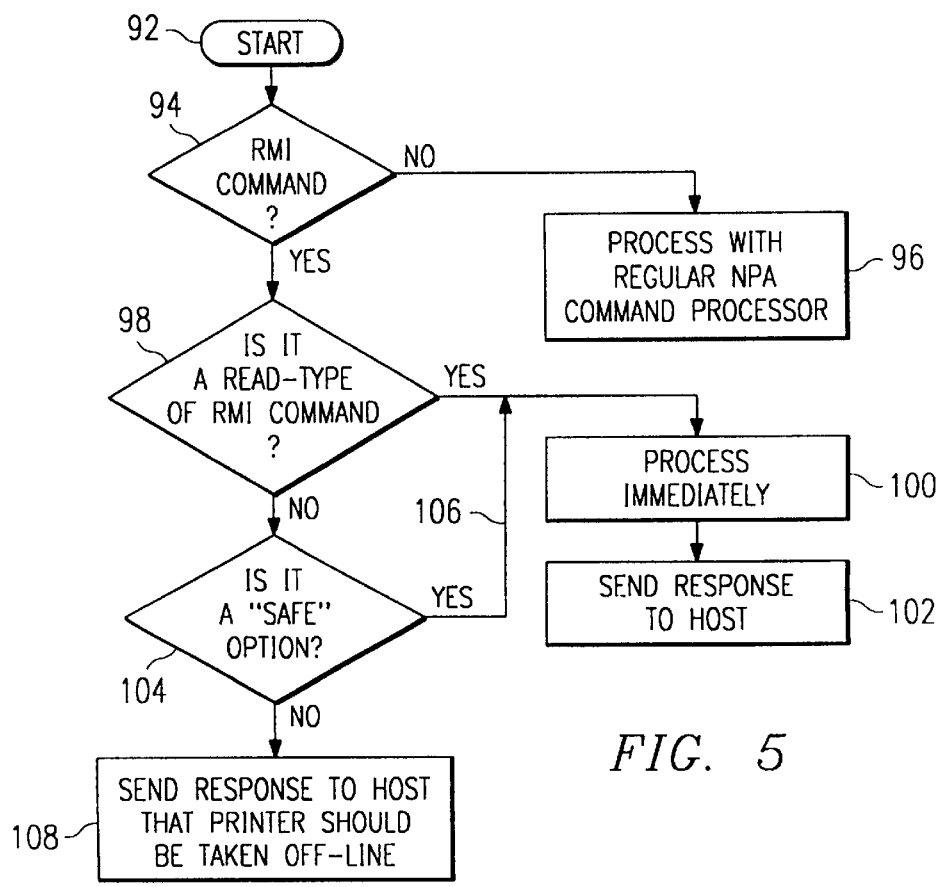
FIG. 5 is a flowchart illustrating the handling of an NPA command by NPAP Task 54 and Remote Menu Interface 68.

Assuming that an NPAP command has been sent, such that we have proceeded to box 84 in FIG. 4, an acceptable process flow for handling the command is shown in FIG. 5. Starting at block 92, the first question that is reached is whether the command is a Remote-Menu Interface (RMI) command as reflected by interrogatory box 94. If it is not an RMI command, the command is handled by the regular NPAP-command processor of NPAP Task 54 as is reflected by box 96. If the command is an RMI command, a determination is made at block 98 as to what type of RMI command it is. There are two basic types is of RMI commands, read-type commands (also referred to as get-type commands) and write-type commands (also referred to as set-type commands). A read-type command will only involve reading stored information in memory 38 (typically NVRAM 44) without modifying it. On the other hand, a write-type RMI command will change or write new configuration data in memory 38 (typically NVRAM 44). Write-type commands can be divided into two groups: "safe" commands and "unsafe" commands. All read-type commands are "safe".

A "safe" command is one that may be executed without taking printer 20 offline. An "unsafe" command is one for which printer 20 should be taken offline before changing the configuration-related variable involved. As an aspect of the present invention, the changing of a default configuration in memory 38 is accomplished immediately if possible upon receiving an appropriate command. That is, the commands do not sit in a queue until being processed, but are processed asynchronously when able. There are occasions, however, when this is not acceptable because a change of the default configuration would be to the potential detriment of printing projects already being handled or which are in the queue for handling prior to the project for which the change is desired. Thus, attention must be made as to whether the command should be handled immediately. For example, if you are using a serial port, you have a certain baud rate specified in the configuration information and you do not want to change that information while sending down a serial job because it might confuse the current job. In this situation, it is desirable to wait until the print job(s) is(are) complete before modifying the baud rate. Thus, a command requesting a change of the baud rate would be recognized by controller 34 as an unsafe command. In the preferred embodiment, a message is sent back to the user at host computer 10 indicating that printer 20 must be taken offline for such a command to be performed. This approach is out of an abundance of caution and for efficiency in software programming. Alternatively, it is possible to program controller 34 to hold the requested unsafe command in memory 38 until it is acceptable to change that portion of the configuration after the print job is complete.

Referring again to FIG. 5, if the command is a read-type RMI command, it is by definition safe, and therefore accepted and executed immediately. Thus, the flow proceeds to box 100 where the command is processed immediately. The immediate processing referenced at box 100 may include, quickly reading a variable from the configuration information stored in memory 38 and sending it to a user at host computer 10 as shown by block 102.

If the answer to interrogatory box 98 is in the negative, it is a write-type RMI command which may be to the detriment of other print projects as described above, and therefore, consideration must be made as to whether the command involves a "safe" option as suggested by interrogatory box 104. If it is a "safe" option, processing flow proceeds along path 106 to box 100 for immediate processing. In this case, immediate processing may involve immediately writing a new value for a configuration-related variable in memory 38. Afterwards, a response indicating that the setting of the variable was successful may be sent to host computer 10 as suggested by block 102.

If the RMI command is not a safe option and the printer is not currently offline, a message is sent to host computer 10 that printer 20 should be taken offline remotely as indicated by box 108. The programmer of the application software in computer 10 may choose to handle this in a number of different ways. The requested command which was unsafe may be stored in the memory of computer 10 and a command generated and sent back to printer 20 requesting printer 20 to go offline. As will be described further below, once printer 20 goes offline in response to such a command, it will send a notice to that effect back to computer 10 and the application program may then re-send the unsafe command, which it has been holding in memory.

Note that a command to go offline may be sent in preparation for sending what is known to be an unsafe command prior to executing the process shown in FIG. 5. This eliminates the need for the process of FIG. 5, and the printer controller 34 immediately processes any received RMI commands, regardless of whether the RMI commands are safe or unsafe. The process reflected in FIG. 5, however, assures that the applications on computer 10 are not required to know if a command is safe or unsafe since printer 20 can make that determination and will send an appropriate response to computer 10 if printer 20 needs to go offline.

As another alternative, controller 34 may be programmed to hold the unsafe command itself for processing once printer 20 is taken offline, and a response sent back to host computer 10 (refer to block 108) might merely inform the user of host computer 10 that there will be some delay in processing the command. Furthermore, the printer 20 can then send an alert to the host computer 10 (immediately after the printer has succeeded in going offline and in processing the unsafe command(s)) to inform the host computer 10 that its request has been processed.

Figure 6:
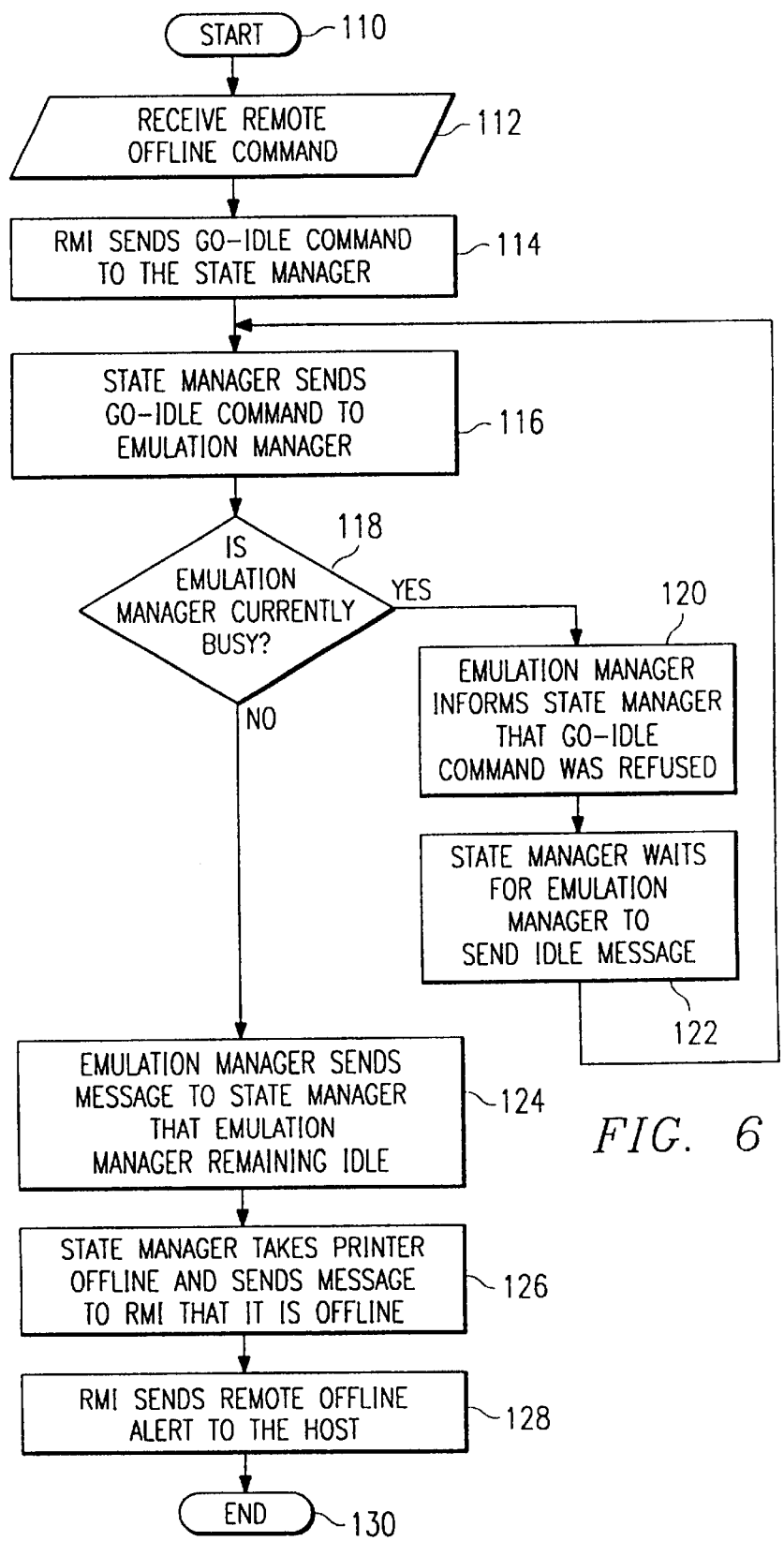
FIG. 6 is a flowchart illustrating the process of taking a printer offline remotely.

Assuming that the software in computer 10 has now sent a command to printer 20 asking that printer 20 be taken offline, the process begins at block 110 of FIG. 6. Proceeding from start block 110, the remote offline command is received at printer 20 as indicated by block 112. The command is handled by NPAP Task 54 which communicates the command to Remote Menu Interface 68 (FIG. 3). Remote Menu Interface 68 sends a message (go-idle) or command to State Manager 70 which will handle taking printer 20 offline at the proper time. This step is reflected at block 114. Before State Manager 70 can make printer 20 go idle, Emulation Manager 60 must be idle.

As indicated by block 116, State Manager 70 sends a go-idle request to Emulation Manager 60. Before this request may be accepted, Emulation Manager 60 must not be busy. The status of Emulation Manager 60 is considered at interrogatory box 118. If Emulation Manager 60 is busy, the Emulation Manager 60 informs State Manager 70 that the go-idle request was refused as is indicated by block 120. Next, State Manager 70 waits for Emulation Manager 60 to send an idle message as reflected by block 122. Once such a message is received, a process continues back to block 116.

If Emulation Manager 60 is found to not be busy, the process continues from interrogatory block 118 to block 124. At block 124, Emulation Manager 60 sends a message to State Manager 70 that Emulation Manager 60 is remaining idle. Next, State Manager 70 takes printer 20 offline and sends a message to Remote Menu Interface 68 that printer 20 is offline as reflected at block 126. At that point, RMI 68 may send a remote offline alert back to host computer 10 as reflected by block 128, and thus complete the remote-offline command process as reflected by block 130. At this point the computer 10 may resend the unsafe command(s). Upon completion of the request (i.e. once the printer has responded that the request has been processed successfully), then the computer 10 may send a command to take the printer back online.

Figure 7:
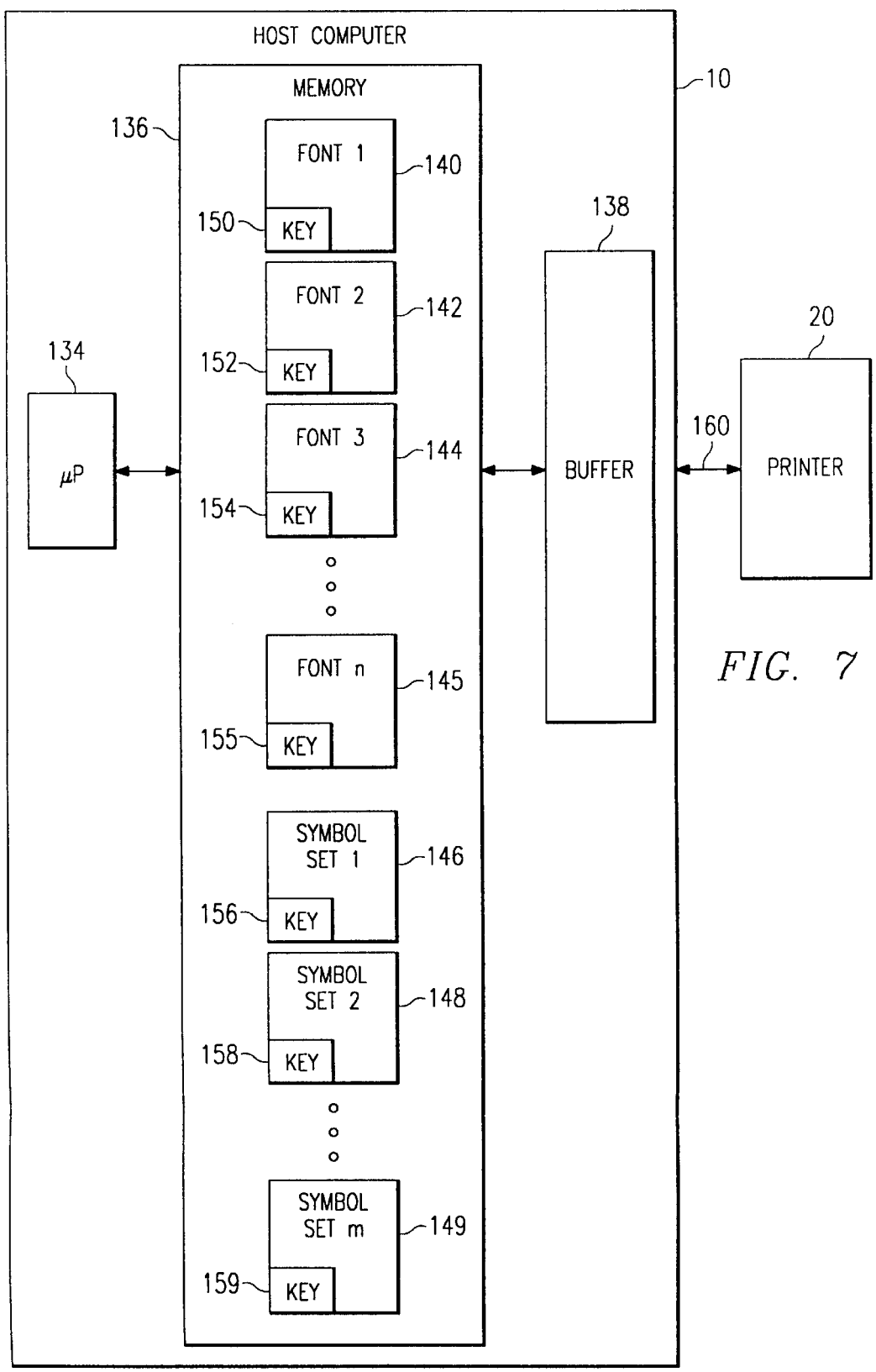
FIG. 7 is a functional block diagram demonstrating the transfer of font and symbol set information according to an aspect of the present invention.

Another aspect of the present invention involves efficient communication of information from printer 20 to computer 10, particularly with respect to font and symbol set information. Referring now to FIG. 7, printer 20 is shown having bidirectional communication with host computer 10, and additional details of host computer 10 are shown including microprocessor 134, memory 136, and buffer 138. Controller 34 of printer 20 is programmed to provide font and symbol set information to computer 10. Font information is symbolically shown stored in memory 136 by a first font-information-packet 140, a second font-information-packet 142 and a third font-information-packet 144. Any number of fonts may be stored in memory 136; this is symbolically shown by font n 145.

Printer 20 is also programmed to communicate to host computer 10 its symbol sets which are symbolically shown as having been placed in memory 136 as a first symbol set 146 and a second symbol set 148. Any number of symbol sets might be placed in memory 136 as is symbolically shown by symbol set m 149.

Font 1 has a symbol-set key 150. Second font package 142 has a symbol-set key 152, and similarly, third font package 144 has a symbol-set key 154. Font n 145 has its corresponding symbol-set key 155. In an orchestrated fashion, symbol set 146 has a symbol-set key 156, and second symbol set 148 has a symbol-set key 158. Symbol set m 149 has its corresponding symbol-set key 159. By programming printer 20 to send information in this manner, the bidirectional communication reflected by arrow 160 is minimized because the font information packets 140, 142, 144, and 145 may be sent without requiring the corresponding symbol set information to follow with each packet. Rather, the symbol set information may be sent once as reflected by symbol sets 146, 148, and 149. Once font packages 140, 142, 144, and 145 and symbol-sets 146, 148 and 149 are in memory 136, processor 134 may compare the keys 150, 152, 154, and 155 with the keys 156, 158, and 159 to determine which symbol sets may be used with which fonts. Through this process, host computer 10 is able to generate a font-information table or index that allows it to have the font information and symbol set information coordinated on its end for the purposes of utilizing printer 20, and is able to accomplish this with a minimum amount of communication 160.

Figure 8:
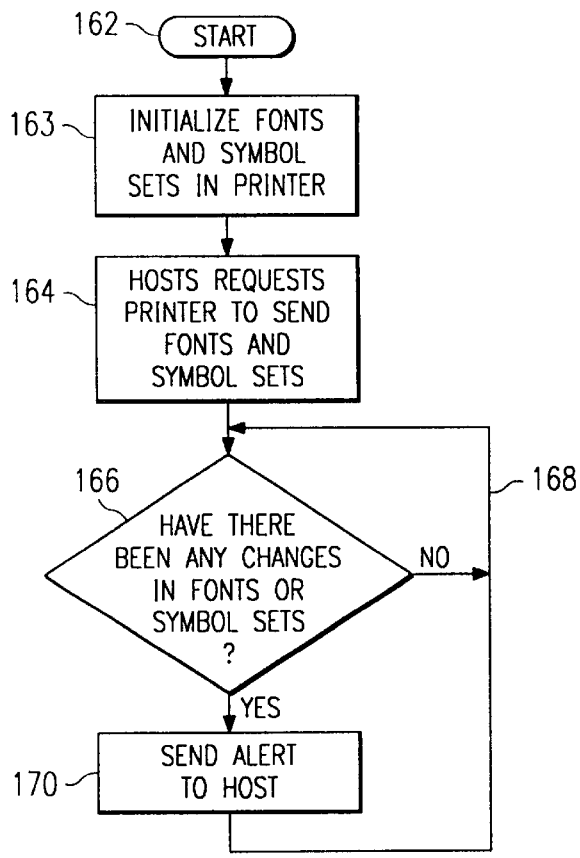
FIG. 8 is a flowchart illustrating the transferring and monitoring of fonts and symbols sets by printer 20.

Referring now to FIG. 8, a process flow starts at block 162 that reflects how printer 20 informs host computer 10 asynchronously of font and/or symbol set changes. As indicated at block 163, printer 20 is first initialized in a manner that gathers the fonts and symbol sets that are resident in printer 20. The fonts and symbol sets stored in printer 20 are gathered as the initialization process checks for any stored fonts or symbol sets in memory 38. After the printer is initialized, the host will typically at some point request the printer to send the fonts and symbol sets as is reflected at block 164. At that point, the fonts and symbol sets are sent from printer 20 to host computer 10.

As reflected by interrogatory box 166 and looping path 168 of FIG. 8, a portion of the software programmed in memory 38 of printer controller 34 will determine when any changes to any of the font or symbol sets that are resident in printer 20 have been made. Once a change to a font or symbol set has been made in printer 20, an alert message is sent to host computer 10 as indicated by block 170. Once the alert is received by host computer 10, a request for the additional changes may be sent by computer 10 to printer 20 and the corresponding information may be sent.

Figure 9:
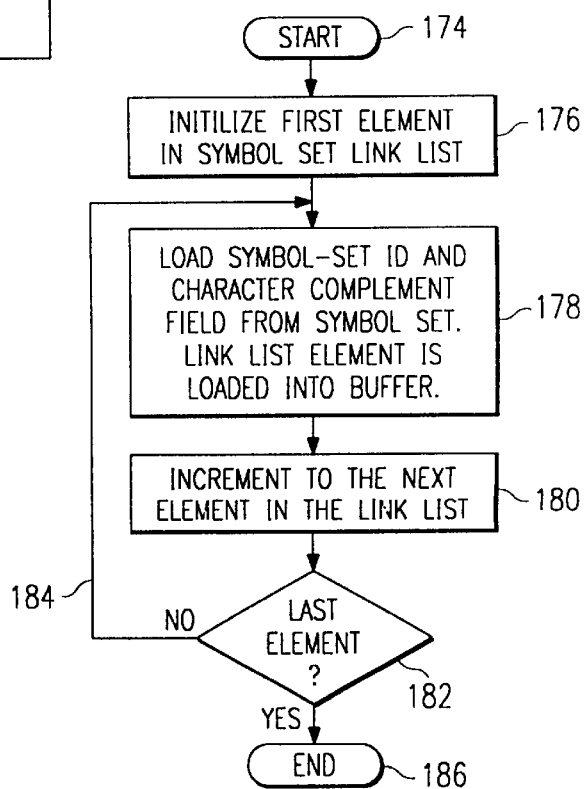
FIG. 9 is a flowchart illustrating the process for transferring symbol set information to host computer 10.

Referring now to FIG. 9, additional details of how the symbol sets are transmitted from printer 20 to host computer 10 are shown with a flow chart beginning at starting block 174. The first step involves initializing the first element in the symbol-set link list as reflected by box 176. Then, the symbol set ID and character compliment from the symbol set are loaded into a buffer as reflected at box 178. Then, the next element in the link list is considered as is reflected by box 180. This process continues as reflected by box 182 and path 184 until the last element is reached, which ends the process as reflected by box 186. Once all of this symbol set information is gathered into the buffer, then it may be sent from printer 20 to host 10 utilizing the "symbol set list" command described below.

At a more detailed level of implementing aspects of the invention discussed above, the Remote Menu Interface 68 may be constructed using standard NPA commands and some non-standard commands (extensions). These non-standard commands and some of the standard commands are discussed below.

The commands processed by the RMI 68 may be used to set variables in memory 38, including those not in NVRAM 44. For example, variables that are not stored in NVRAM, e.g., lines-per-page, are also accessible through commands that previously applied only to NVRAM variables. Furthermore, the set-variables-with validation command may do more than change values stored in NVRAM 44; if appropriate, other variables and configurations may be changed as well. For example, when the command is issued to set the x-resolution to 600, then the y-resolution in the printer 20 may be automatically set to 600 as well. Another example would be that a command to change the parallel protocol from standard to fastbytes would not only update the NVRAM variable, but would also make the necessary BIOS calls to immediately change the protocol.

To read the variables in printer 20, the extensions to the NPA commands set forth in Table 1 are appropriate.

TABLE 1

Read Variables Host Command and Printer Response

| Command: | Extension |
| Subcommand: | Read/Write Variables |
| Function: | Read Variable |
| Byte | Value-Hex | Description | Notes |

HOST COMMAND

| | | | |
|---|---|---|---|
| 1 | A5 | Start-of-packet (SOP) Byte | Packet Header |
| 2 | 00 06 | Length in Bytes (Does not include these 2 bytes nor the SOP byte) | |
| 1 | Unsigned Byte | Flag | |
| 1 | E0 | Command: Extension | |
| 1 | E7 | Subcommand: Read/Write Variables | Data Field |
| 1 | 00 | Function: Read Variables | |
| 2 | Unsigned Word | NPA ID for the desired option. | |

PRINTER RESPONSE

| | | | |
|---|---|---|---|
| 1 | A5 | Start-of-packet (SOP) Byte | Packet Header |
| 2 | Unsigned Word | Length in Bytes (Does not include these 2 bytes nor the SOP byte) | |
| 1 | Unsigned Byte | Flag | |
| 1 | E0 | Command: Extension | |
| 1 | E7 | Subcommand: Read/Write Variables | Data Field |
| 1 | 00 | Function: Read Variables | |
| 2 | Unsigned Word | ID of the option that was requested. | |

TABLE 1-continued

Read Variables Host Command and Printer Response

| Command: | Extension |
| Subcommand: | Read/Write Variables |
| Function: | Read Variable |
| Byte | Value-Hex | Description | Notes |

| | | | |
|---|---|---|---|
| n | | The value of the requested options. Information returned is dependent on the variable reguested. | |

Table Note:
The size of the response depends on the specific variable. Variables range in size from 1 byte to 33 bytes. Also, since some variables are specific to emulators (PS, PCL, etc.) the data format of these variables may be different.

To implement the commands, a unique NPA identification must exist for each variable such as, for example, those shown in Table 2.

TABLE 2

NPA Identifications

| NPA id (hex) | Name | NVRAM bytes | Variable type | Description |
|---|---|---|---|---|
| 0x0000 | NVNPAGES | 4 | sys | Number pages printed |
| 0x0001 | NVEMULATION | 1 | sys | Default emulation |
| 0x0003 | NVBLANKSUPPRESS | 1 | sys | Suppress blank pages |
| 0x0004 | NVPRNDARK | 1 | sys | Print darkness |
| 0x0005 | NVPRINTTIMEOUT | 1 | sys | Form feed time-out of non-PS |
| 0x0006 | NVHONORINIT | 1 | sys | Honor init |
| 0x0007 | NVNCOPIES | 2 | sys | Number of copies |
| 0x0008 | NVPOWERSAV | 1 | sys | Power saver mode |

To set the variables, making other automatic configuration changes as necessary, as described above, consider the following extension and response shown in Table 3:

TABLE 3

Set Variables With Validation Host Command And Printer Response

HOST COMMAND

| Command: | Extension (set command) |
| Subcommand | Read/Write Variables |
| Function: | Set Variables With Validation |
| Byte | Value-Hex | Description | Notes |

| | | | |
|---|---|---|---|
| 1 | A5 | Start-of-packet (SOP) Byte | Packet Header |
| 2 | Unsigned Word | Length in Bytes (Does not include these 2 bytes nor the SOP byte) | |
| 1 | Unsigned Byte | Flag | |
| 1 | E0 | Command: Extension | |
| 1 | E7 | Subcommand: Read/Write Variables | Data Field |
| 1 | 01 | Function: Set Variables With Validation | |
| 2 | Unsigned Word | NPA ID of the variable to change | |
| n | | New value for the variable | |

PRINTER RESPONSE

| Command: | Extension |

TABLE 3-continued

Set Variables With Validation Host Command And Printer Response
Subcommand: Read/Write Variables
Function: Set Variables With Validation

| Byte | Value-Hex | Description | Notes |
|---|---|---|---|
| 1 | A5 | Start-of-packet (SOP) Byte | Packet Header |
| 2 | Unsigned Word | Length in Bytes Does not include these 2 bytes nor the SOP byte) | |
| 1 | Unsigned Byte | Flag | |
| 1 | E0 | Command: Extension | |
| 1 | E7 | Subcommand: Read/Write Variables | Data Field |
| 1 | 01 | Function: Set Variables With Validation | |
| 2 | Unsigned Word | NPA ID of the variable to change. | |
| 1 | Unsigned Byte | Return Code | |
| | 0 | error | |
| | 1 | success | |
| | 2 | deferred | |
| n | Binary | New value of the variable (or old value if error occurred or set was deferred.) | |

Table Notes:
The command will be rejected if the option ID is not found.
Data validation is performed, the set operation is not performed if the data validation fails.
If the set of the variable was classified as "deferred" then the variable will not be changed until the printer receives and processes the remote offline command.

As shown in Table 3, the format of the printer response for this command contains a return code byte that indicates whether the write was successful or not. As reflected by the second from last row in the above table, a return code of "0" indicates that an error occurred. A return code of "1" indicates that the write was successful. A return code of "2" indicates that the write cannot occur until the user has the printer 20 taken offline by issuing a "remote online-offline" command. Following this return code is a statement of the option that is being set. If the set was successful, then this should match the value sent by the user in the "set" command. Otherwise, this value will be the old, or unchanged, value of the option.

As previously noted, in order to change an unsafe option, a command must be issued to take the printer offline remotely, and thus giving rise to the "remote online-offline" command. As previously discussed, an "unsafe" command may include such things as setting the link protocol options (baud rate, fastbytes on/off), or commands that affect the BIOS such as print contrast. If the user tries to change one of these "unsafe" options before taking the printer offline remotely, the printer's response to the set command will include a return code of "2" indicating that the option cannot be changed until the user takes the printer offline remotely. The NPA command for taking the printer offline remotely may be as shown in Table 4:

TABLE 4

Remote ONLINE-OFFLINE Host Command And Printer Response

Command: Extension
Subcommand: Read/Write Variables
Function: Remote Online-Offline

| Byte | Value-Hex | Description | Notes |
|---|---|---|---|
| HOST COMMAND | | | |
| 1 | A5 | Start-of-packet (SOP) Byte | Packet |

TABLE 4-continued

Remote ONLINE-OFFLINE Host Command And Printer Response

Command: Extension
Subcommand: Read/Write Variables
Function: Remote Online-Offline

| Byte | Value-Hex | Description | Notes |
|---|---|---|---|
| 2 | 00 06 | Length in Bytes (Does not include these 2 bytes nor the SOP byte) | Header |
| 1 | Unsigned Byte | Flag | |
| 1 | E0 | Command: Extension | |
| 1 | E7 | Subcommand: Read/Write Variables | Data Field |
| 1 | 0C | Function: Remote Online-Offline | |
| 1 | 0x00 | Online | |
| | 0x01 | Offline | |
| 1 | Unsigned Byte | If the request is for "offline", then this byte indicates the number of minutes until the printer will automatically go online if the remote online is not issued. If this value is greater than 60, then it will default to 60. If this value is 0, then the printer will use its default of 3 minutes. | |
| PRINTER RESPONSE | | | |
| 1 | A5 | Start-of-packet (SOP) Byte | Packet |
| 2 | 00 06 | Length in Bytes Does not include these, 2 bytes nor the SOP byte) | Header |
| 1 | Unsigned Byte | Flag | |
| 1 | E0 | Command: Extension | |
| 1 | E7 | Subcommand: Read/Write Variables | Data Field |
| 1 | 0C | Function: Remote Online-Offline | |
| 1 | Unsigned Byte | Host requested value (online or offline) | |
| 1 | 0x00 | Request Rejected | |
| | 0x01 | Request Accepted | |

Table Note:
If the request is rejected, then another host has already requested that the printer go offline. If an offline requested is accepted, then the printer will go offline as soon as the printer no longer has any print jobs to process. The maximum wait for the host is undefined. Once the printer has gone offline an alert will be sent to registered hosts.

The user at computer 10 is expected to take the printer back online remotely after having set the desired options by using the "Remote Online-Offline" command described above. However, to avoid the situation where printer 20 could get hung by a user taking the printer offline remotely and not putting it back online, printer controller 34 of printer 20 is programmed to automatically go back online after a specific time-out period. The user can specify the length of that time-out period in the time-out byte that is part of the remote offline command. The valid range of values for the time-outs are preferably from one minute to 60 minutes. The time-out is set as soon as printer 20 actually goes offline. When the Remote Menu Interface 68 is used to take printer 20 offline, the panel indications 30 (FIG. 1) may indicate the change. Another option for bringing the printer 20 back online is for the appropriate button, e.g., button 32, to be pressed at this point. Similarly, a front-panel reset may be used to bring it back online as well.

A remote offline command is not executed until printer 20 goes idle and so an offline command may be pending. If a remote offline command is sent to printer 20, but another remote offline request is pending, the second command will be rejected. This assures that only one host computer 10 attached to printer 20 may be making configuration changes at any given time. If a host's request to take the printer offline remotely is rejected, then the host waits until the printer indicates that it is back online (via an "Online-Offline Alert") before attempting to resend the request.

When host computer 10 has requested that printer 20 go offline, printer 20 must advise back to computer 10 when it has successfully gone offline, and at the appropriate time it is also necessary to advise when it has gone back online. The remote-online-offline alert is used for this purpose; one example of this alert is shown in Table 5.

TABLE 5

Remote ONLINE-OFFLINE Alert
PRINTER ALERT

Command: Alert
Subcommand: Extension Alert
Function: Remote Online-Offline

| Byte | Value-Hex | Description | Notes |
|---|---|---|---|
| 1 | A5 | Start-of-packet (SOP) Byte | Packet |
| 2 | Unsigned Word | Length in Bytes (Does not include these 2 bytes nor the SOP byte) | Header |
| 1 | Unsigned Byte | Flag | |
| 1 | F0 | Command: Alert | |
| 1 | 03 | Subcommand: Extension Alert | Data |
| 1 | 40 | Function: Variable Event | Field |
| 1 | 0C | Remote Online-Offline | |
| 1 | 0x00 | Printer is "Online" | |
|   | 0x01 | Printer is "Offline" | |

This requires that host computer 10 first register the extension alerts, as will be described below.

The commands that may be used to implement one embodiment of the present invention that involves the transmission of symbol sets and fonts from printer 20 to host computer 10 are now discussed. One command that facilitates this is the symbol set list command. This command returns a list of all known symbol sets that are currently available in printer 20. For each symbol set, the printer may provide a response giving the symbol set identification and an 8-byte character complement. The user can then take this symbol set character complement and logically AND it with the character complement of any font, i.e., use what was symbolically referred to as the keys 150–159 in FIG. 7 to construct a font table or index of fonts and symbol sets in computer 10. Using one specific logical-AND approach, if the ANDing result is "0," then it indicates that the font supports the symbol set. The NPA command to get the symbol sets may be as in Table 6.

TABLE 6

Symbol Set List Host Command and Printer Response

Command: Extension
Subcommand: Read/Write Variables
Function: Symbol Set List

| Byte | Value-Hex | Description | Notes |
|---|---|---|---|
| HOST COMMAND | | | |
| 1 | A5 | Start-of-packet (SOP) Byte | Packet |
| 2 | 00 04 | Length in Bytes (Does not include these 2 bytes nor the SOP byte) | |
| 1 | Unsigned Byte | Flag | |
| 1 | E0 | Command: Extension | |
| 1 | E7 | Subcommand: Read/Write Variables | Data Field |

TABLE 6-continued

Symbol Set List Host Command and Printer Response

Command: Extension
Subcommand: Read/Write Variables
Function: Symbol Set List

| Byte | Value-Hex | Description | Notes |
|---|---|---|---|
| 1 | 0D | Function: Symbol Set List | |
| PRINTER RESPONSE | | | |
| 1 | A5 | Start-of-packet (SOP) Byte | Packet |
| 2 | Unsigned Word | Length in Bytes (Does not include these 2 bytes nor the SOP byte) | |
| 1 | Unsigned Byte | Flag | |
| 1 | E0 | Command: Extension | |
| 1 | E7 | Subcommand: Read/Write Variables | Data Field |
| 1 | 0D | Function: Symbol Set List | |
| 2 | Unsigned Word | Number of Symbol Sets to be returned(n) | SSID 1 |
| 2 | Unsigned Word | Symbol Set ID | |
| 8 | Binary | Character Compliment | |
| — | — | — | |
| 2 | Unsigned Word | Symbol Set ID | SSID n |
| 8 | Binary | Character Compliment | |

In addition to symbol set information, the font information is needed by computer 10. The get-current-font-information command, which is shown in the Table 7 below, returns four items of information that uniquely identify the current default font: font source, font position, symbol set identification, and point or pitch. Concerning this last item of information, the point value will be returned if a font is a proportional bitmap or proportional outline font, and the pitch value will be returned if the font is a fixed bitmap or monospaced outline font.

TABLE 7

Get Current Font Information Host Command and Printer Response

Command: Extension
Subcommand: Read/Write Variables
Function: Get Current Font Information

| Byte | Value-Hex | Description | Notes |
|---|---|---|---|
| HOST COMMAND | | | |
| 1 | A5 | Start-of-packet (SOP) Byte | Packet |
| 2 | 00 04 | Length in Bytes (Does not include these 2 bytes nor the SOP byte) | |
| 1 | Unsigned Byte | Flag | |
| 1 | E0 | Command: Extension | |
| 1 | E7 | Subcommand: Read/Write Variables | Data Field |
| 1 | 0E | Function: Get Current Font Information | |
| PRINTER RESPONSE | | | |
| 1 | A5 | Start-of-packet (SOP) Byte | Packet |
| 2 | Unsigned Word | Length in Bytes (Does not include these 2 bytes nor the SOP byte) | |
| 1 | Unsigned Byte | Flag | |
| 1 | E0 | Command: Extension | |
| 1 | E7 | Subcommand: Read/Write Variables | Data Field |
| 1 | 0E | Function: Get Current Font Information | |
| 1 | Unsigned Byte | Source ID | |
|   | 00 | Resident | |
|   | 01 | Removable Font Card | |
|   | 02 | Disk | |

TABLE 7-continued

Get Current Font Information Host Command and Printer Response

Command: Extension
Subcommand: Read/Write Variables
Function: Get Current Font Information

| Byte | Value-Hex | Description | Notes |
|---|---|---|---|
|  | 03 | RAM |  |
|  | 04 | Flash |  |
|  | FF | Unknown |  |
| 2 | Unsigned Word | Position |  |
| 2 | Unsigned Word | SSID |  |
| 4 | Unsigned DBL Word | Point or Pitch |  |

It is also desirable to be able to set the current default font using the font source, font position, symbol set identification and point or pitch as described above. Printer 20 may respond with a return code. If any of the four parameters for uniquely identifying the font are invalid when sent to printer 20, or the given symbol set is not supported by the given font, then the return code from printer 20 will indicate to computer 10 that a problem exists and no change will made to the printer options. The response back to computer 10 may include "invalid source or position," "invalid SSID," or "invalid point or pitch." An appropriate NPA extension is shown in Table 8:

TABLE 8

Set Current Font Information Host Command And Printer Response

Command: Extension
Subcommand: Read/Write Variables
Function: Set Current Font Information

| Byte | Value-Hex | Description | Notes |
|---|---|---|---|
| HOST COMMAND |  |  |  |
| 1 | A5 | Start-of-packet (SOP) Byte | Packet Header |
| 2 | 00 00D | Length in Bytes (Does not include these 2 bytes nor the SOP byte) | Packet Header |
| 1 | Unsigned Byte | Flag |  |
| 1 | E0 | Command: Extension |  |
| 1 | E7 | Subcommand: Read/Write Variables | Data Field |
| 1 | 0F | Function: Set Current Font Information |  |
| 1 | Unsigned Byte | Source ID |  |
|  | 00 | Resident |  |
|  | 01 | Removable Font Card |  |
|  | 02 | Disk |  |
|  | 03 | RAM |  |
|  | 04 | Flash |  |
| 2 | Unsigned Word | Position |  |
| 2 | Unsigned Word | SSID |  |
| 4 | Unsigned DBL Word | Point or Pitch |  |
| PRINTER RESPONSE |  |  |  |
| 1 | A5 | Start-of-packet (SOP) Byte | Packet Header |
| 2 | Unsigned Word | Length in Bytes (Does not include these 2 bytes nor the SOP byte) | Packet Header |
| 1 | Unsigned Byte | Flag |  |
| 1 | E0 | Command: Extension |  |
| 1 | E7 | Subcommand: Read/Write Variables | Data Field |
| 1 | 0F | Function: Set Current Font Information |  |
| 1 | Unsigned Byte | Return Code |  |
|  | 0 | OK |  |
|  | 1 | Invalid Source or Position |  |

TABLE 8-continued

Set Current Font Information Host Command And Printer Response

Command: Extension
Subcommand: Read/Write Variables
Function: Set Current Font Information

| Byte | Value-Hex | Description | Notes |
|---|---|---|---|
|  | 2 | Invalid SSID |  |
|  | 3 | Invalid Point or Pitch |  |

Alerts may be used to inform the host computer 10 when printer 20 goes remotely offline or online and when fonts or symbol sets are added or deleted from memory 38. To use these alerts, the host computer 10 must first register the extension alerts, as described below. One technique for accomplishing this is to use bit 6 (remote online-offline alert) and bit 1 (flash/disk or memory alert) of the bit-encoded byte of this command set. Bit 6 may tell printer 20 to send alerts indicating when it has succeeded in taking the printer offline-online remotely. Bit 1 may tell printer 20 to send alerts whenever the status of flash 46 and/or disk 48 changes. For example, the change may include the deletion or copying of a font or symbol set. In this regard, consider the following command set forth in Table 9:

TABLE 9

Register For Extension Alerts Host Command and Printer Response

Command: Extension
Subcommand: Register for Extension Alerts

| Byte | Value-Hex | Description | Notes |
|---|---|---|---|
| HOST COMMAND |  |  |  |
| 1 | A5 | Start-of-packet (SOP) Byte | Packet Header |
| 2 | 00 04 | Length in Bytes (Does no include these 2 bytes nor the SOP byte) | Header |
| 1 | Unsigned Byte | Flag |  |
| 1 | E0 | Command: Extension |  |
| 1 | 03 | Subcommand: Register for Extension Alerts | Data Field |
| 1 | Bit Encoded Byte | Job Features Summary Bit 0 - Job Statistic Alert Bit 1 - Flash/Disk Alerts Bit 2 - SNMP Traps Bit 3 - Page Alerts Bit 4 - Partial Page Alerts Bit 5 - Job Transition Alerts Bit 6 - Remote Online-Offline Alert Bit 7 - Checksum Alert II |  |
| PRINTER RESPONSE |  |  |  |
| 1 | A5 | Start-of-packet (SOP) Byte | Packet Header |
| 2 | 00 03 | Length in Bytes (Does not include these 2 bytes nor the SOP byte) | Header |
| 1 | Bit Encoded Byte | Flag |  |
| 1 | E0 | Command: Extension |  |
| 1 | E3 | Subcommand: Register for Extension Alerts | Data Field |

Table Note:
A bit value of 1 enables an alert, a value of 0 disables an alert.

If a device alert sent by printer 20 to host computer 10 indicates that fonts and/or symbol sets have been deleted from or copied to memory 38, then the host computer 10 responds by updating the dynamic font information table with the current printer font/symbol set information.

An application based on host computer 10 may require real-time access to relatively large amount of information associated with the available fonts and symbol sets on printer 20 in order to display lists. For example, for a given font source, the host-based application may want to display a list of all the available fonts by name, and for a given font, the application may want to display a list of all the legitimate symbol sets. With a relatively slow transfer rate of printer-to-host data (via IEEE-1284 nibble mode handshake, or the like), the transfer could take an unacceptable amount of time. The Remote Menu Interface 68 offers commands that efficiently provide collective font and symbol set information that a host-based application may need to build such lists.

The transfer of font information will typically involve the standard NPA command: "requests interpreter characteristics—font details." This command returns a list of all the available permanent fonts associated with the given interpreter or emulator, e.g., PCL, and a given font source. The list includes all the details associated with each font with the exception of the valid symbol sets for each font. Next, the symbol-set-list command may be used to return all of the permanent symbol sets currently active in the printer. The symbol set list contains a character complement representation for each symbol set, i.e., what was shown symbolically by keys 156, 158, and 159 in FIG. 7. Once the host-based application has these two lists, it can determine which symbol sets are valid for which fonts by logically ANDing the character complement representation of a given font, i.e., keys 150 to 155 of FIG. 7, with the character complement representation of a given symbol set, i.e., keys 156 to 159 of FIG. 7. For example, if logically ANDing the two character compliments results in zero, then the given symbol set is valid for that font.

Because fonts and symbol sets can be added to or deleted from printer 20 at any time, printer 20 must be able to asynchronously inform host computer 10 that such a change is taking place. This allows the host-based application to maintain its own dynamic font information tables in an efficient manner that requires only a minimum number of queries to printer 20 to obtain collective font and symbol set data. The host-based application on computer 10 may monitor the permanent font or symbol set activity in memory 38 of printer 20. To monitor this information, the host-based application can first send the command to register extension alerts. This command enables printer 20 to send device alerts whenever fonts and/or symbol sets are added or deleted from flash 46 or disks 48 of memory 38. Next, when printer 20 sends a device alert, host computer 10 should determine if the alert signifies a deletion or copying of a font or symbol set. If either is true, then the host-based dynamic font information table is now out of date as compared to information resident in printer 20. Alternatively, this may be accomplished for RAM using existing NPA commands as will be discussed immediately below.

To monitor the permanent font or symbol set activity in RAM, the host-based application may send a printer-configuration-control-selecting-device-status-alerts command with the configuration change bit set in order to enable printer 20 to send device status alerts at any time that permanent fonts or symbol sets are downloaded to or removed from printer memory 38. When printer 20 sends a device status alert, host computer 10 should determine if the configuration change bit is set in the third bit-encoded byte of the alert. If this bit is set, computer 10 should then issue a request-device-status-configuration-change command. Printer 20 may respond to this command by indicating the nature of the configuration change.

If a response by printer 20 indicates that a permanent font or symbol set has been downloaded to or removed from printer memory 38, then the host-based dynamic font information table is no longer reflective of the font information in printer 20. Therefore, it may be desirable to update the appropriate tables by issuing the "Request Interpreter Characteristics—Font Details" command for downloaded fonts, as well as the "Symbol Set List" command.

Individual font details may be obtained by the Read Variables command. This command will allow one to get the font variable information, one variable at a time. However, when getting the current default font, it is preferable to get all the vital details that uniquely identify the font at one time. The "Get Current Font Information" command returns the current font source, font position, symbol set, and point or pitch. The host-based application can then determine whether the is fourth parameter is pitch or point by analyzing the font information table that it is maintaining. If information returned does not identify a font in the host-based font information table, then the host-based application needs to update its table.

Individual font details may be readily updated using the "Set Variables With Validation" command. This command will allow the individual font details to be set one variable at a time. However, updating or setting the current font in printer 20 is preferably accomplished with the command "Set Current Font Information," which requires the requested font source, font position, symbol set and pitch or point within one command. When printer 20 receives this command, it will first check to see if it is a valid combination of the font details. If it is not a valid combination, printer 20 will not change the current font, and will return in response a code that indicates why this combination is not valid. If it is valid, printer 20 will change the current font information and respond with an "OK" return code.

Although the present invention has been described in detail with reference to preferred embodiments, it should be understood that various changes, substitutions, and alterations can be made hereto without departing from the spirit and scope of the invention as defined by the following claims.

What is claimed is:

1. A printer, comprising:
   a printer controller having a memory for storing a plurality of printer configuration settings, and a processor; and
   a port coupled to said printer controller which receives signals from a host computer,
   wherein said printer controller receives configuration change information via said port and processes said configuration change information to effect an update of one or more of said plurality of printer configuration settings using said configuration change information while said printer is processing a current print job if said update will not adversely affect the processing of said current print job.

2. The printer of claim 1, wherein said printer processor processes said configuration change information to effect a substantially immediate update of said one or more of said plurality of printer configuration settings using said configuration change information.

3. The printer of claim 2, wherein said printer processor further informs the host computer when said changes have been made.

4. The printer of claim 1, wherein upon updating said printer configuration settings said processor further updates the printer configuration environment associated with the updated settings while said printer is processing said current print job.

5. The printer of claim 1 wherein said printer controller is further programmed to notify the host computer if a command received with said configuration change information is not safe to process immediately while the printer is busy processing said current print job, informing the host computer to go offline.

6. The printer of claim 1 wherein the printer controller is further programmed to take the printer offline as soon as possible upon receiving a remote-offline command from said host computer.

7. The printer of claim 6 wherein the printer controller is further programmed to notify said host computer when the printer has been taken offline in response to said remote-offline command.

8. The printer of claim 6 wherein the printer controller is further programmed to respond to a remote online command received from said host computer by going back online.

9. The printer of claim 8 wherein the printer controller is further programmed to provide an acknowledgment response to said host computer upon successfully going back online.

10. The printer of claim 1 wherein the printer controller is further programmed to:
   collect all the resident font and symbol set information;
   identify each font by a predetermined number of variables; and
   send said predetermined number of variables for each font and the symbol set information to said host computer.

11. The printer of claim 10 wherein said printer controller is further programmed to generate and send an alert to said host computer if any font or symbol set in said memory of said printer is modified.

12. A printer for preparing printed pages of information from signals transmitted by a host computer, the printer comprising:
   a port for receiving signals from the host computer;
   a processor coupled to the port;
   a printer memory device coupled to the processor for holding coded instructions and data; and
   a print engine coupled to the processor for receiving signals from the processor and printing pages of information in response thereto,
   wherein the coded instructions in printer memory in conjunction with the processor are operable to send symbol sets that are resident in the memory device to the host computer, and
   wherein the coded instructions and processor are further operable to receive a remote offline command requesting that the printer be taken to an offline state and to take the printer offline at the next available time.

13. A printer communication system including a host computer, a printer, and a communication means for coupling the host computer and printer to provide for bidirectional communication of signals therebetween, wherein the printer comprises:
   a port coupled to the communication means for receiving signals from the host computer through the communication means and transmitting signals to the host computer;
   a printer controller coupled to the port, wherein the printer controller comprises a printer microprocessor, and a printer memory device coupled to the processor, the printer memory device for holding coded instructions and data; and
   a print engine coupled to the printer controller for receiving signals from the printer processor and printing pages of information in response thereto,
   wherein the coded instructions and printer processor are operable to:
      (a) send symbol sets that are resident in the printer memory device to the host computer,
      (b) send font information resident in the printer memory to the host computer, and
      (c) receive configuration-related commands from the host computer and accept and execute them immediately if the configuration-related command does not interfere with any current activities of the printer and inform the host computer if the configuration-related command would interfere with the current activities of the printer.

14. The printer communication system of claim 13, wherein the coded instructions and printer processor are further operable to receive a remote offline command requesting that the printer be taken to an offline state and to take the printer offline at the next available time.

15. The printer communication system of claim 13, wherein the coded instructions and printer processor are further operable to:
   send symbol sets that are resident in the printer memory device to the host computer; and
   send font information resident in the printer memory to the host computer.

16. The printer communication system of claim 15, wherein the coded instructions and printer processor are further operable to send an alert message to the host computer as soon as the printer is taken offline.

17. The printer communication system of claim 16, wherein the coded instructions and printer processor are further operable to receive an online command through the port and remotely take the printer back online.

18. The printer communication system of claim 17, wherein the coded instructions and printer processor are further operable to send an alert to the host computer when the printer has been placed back online.

19. The printer communication system of claim 17, wherein the coded instructions and printer processor are further operable to go back online automatically if a remote online command does not follow a remote offline command after a specified time-out during which no activity takes place.

20. The printer communication system of claim 15, wherein the coded instructions and printer processor are further operable to send an alert to the host computer whenever any font or symbol set information in printer memory is modified.

21. The printer communication system of claim 13, wherein the host computer includes a processor and memory operable to send a command to change a current font setting in the printer that contains four variables uniquely describing the desired font, and wherein the coded instructions and printer processor are further operable to receive the command to change the current font and to only allow the change of the current font if the variables in the change current font command identify a valid font in printer memory.

22. The printer communication system of claim 13 wherein the host computer is programmed to construct a dynamic font table from the font information and symbol sets sent by the printer.

23. A method of updating operation configuration settings of a printing apparatus, comprising the steps of:
   receiving configuration change information from a host computer;
   processing said configuration change information; and
   updating one or more of said configuration settings using said configuration change information while said printing apparatus is processing a current print job if said updating will not adversely affect the processing of said current print job.

24. The method of claim 23, wherein said updating step further comprises substantially immediately updating said one or more of said configuration settings after processing said configuration change information.

25. The method of claim 23, further comprising the step of updating a configuration environment associated with said updated settings upon said updating of said configuration settings while said printer is processing said current print job.

* * * * *